(12) United States Patent
Seko (10) Patent No.: US 7,830,605 B2
(45) Date of Patent: Nov. 9, 2010

(54) LONGITUDINAL INTERFERENCE FRINGE PATTERN PROJECTION LENS, OPTICAL SYSTEM, AND THREE-DIMENSIONAL IMAGE ACQUISITION APPARATUS

(75) Inventor: Yasuji Seko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 152 days.

(21) Appl. No.: 11/750,411

(22) Filed: May 18, 2007

(65) Prior Publication Data

US 2008/0112054 A1 May 15, 2008

(30) Foreign Application Priority Data

Nov. 10, 2006 (JP) .............................. 2006-306055

(51) Int. Cl.
*G02B 27/10* (2006.01)
*G02B 27/00* (2006.01)
*G02B 3/00* (2006.01)
*G02B 9/00* (2006.01)

(52) U.S. Cl. .................... 359/619; 359/649; 359/577

(58) Field of Classification Search ................. 359/619, 359/577, 581, 649, 651, 742–743; 355/67
See application file for complete search history.

(56) References Cited

U.S. PATENT DOCUMENTS 7,009,713 B2 * 3/2006 Seko et al. .................. 356/498

2005/0259266 A1 11/2005 Seko

FOREIGN PATENT DOCUMENTS

| CN | 1779560 A | 5/2006 |
|---|---|---|
| CN | 1803096 A | 7/2006 |
| JP | 07-234104 A | 9/1995 |
| JP | 09-042926 A | 2/1997 |
| JP | 3082516 B2 | 6/2000 |
| JP | 2004-28977 A | 1/2004 |
| JP | 2004-212328 A | 7/2004 |
| JP | 2005-331784 A | 12/2005 |
| JP | 2006-106205 A | 4/2006 |

OTHER PUBLICATIONS

Chinese Office Action dated Jan. 16, 2009.
Chinese Office Action dated May 22, 2009.

* cited by examiner

*Primary Examiner*—Alicia M Harrington
(74) *Attorney, Agent, or Firm*—Sughrue Mion, PLLC (57) ABSTRACT

A longitudinal interference fringe pattern projection lens with a lens body is provided. The lens body includes a lens first surface that has two convex portions or two concave portions that extend in parallel to each other in a constant direction and have the same shape, and a lens second surface. Laser light passing through one convex or concave portion interferes with laser light passing through the other convex or concave portion to form a longitudinal interference fringe pattern.

17 Claims, 9 Drawing Sheets

LONGITUDINAL INTERFERENCE FRINGE PATTERN PROJECTION LENS, OPTICAL SYSTEM, AND THREE-DIMENSIONAL IMAGE ACQUISITION APPARATUS

CROSS-REFERENCE TO RELATED APPLICATIONS

This application is based on and claims priority under 35 U.S.C. 119 from Japanese Patent Application No. 2006-306055 filed Nov. 10, 2006.

BACKGROUND

1. Technical Field

The present invention relates to a longitudinal interference fringe pattern projection lens, to an optical system, and to a three-dimensional image acquisition apparatus, particularly, to a longitudinal interference fringe pattern projection lens adapted to project a longitudinal interference fringe pattern formed by interference of light beams.

2. Related Art

An optical lens system forming a concentric interference pattern by causing interference of light beams is known.

SUMMARY

According to an aspect of the present invention, a longitudinal interference fringe pattern projection lens comprising: a lens body; a lens first surface that constitutes one surface of the lens body, and that has two convex or concave portions, which extend in parallel to each other in constant direction and have a same shape; and a lens second surface that constitutes the other surface of the lens body, wherein laser light passing through one convex or concave portion interferes with laser light passing through the other convex or concave portion to form a longitudinal interference fringe pattern.

BRIEF DESCRIPTION OF THE DRAWINGS

Exemplary embodiment of the present invention will be described in detail based on the following figures, wherein:

FIGS. 1A to 1C illustrate an embodiment of a longitudinal interference fringe pattern projection lens according to the invention.

FIGS. 5A to 5C illustrate another embodiment of the longitudinal interference fringe pattern projection lens according to the invention.

FIGS. 9A to 9C illustrate another embodiment of the longitudinal interference fringe pattern projection lens according to the invention.

DETAILED DESCRIPTION

Hereinafter, embodiments of the invention are described with reference to the accompanying drawings.

First Embodiment

Figure 1A:
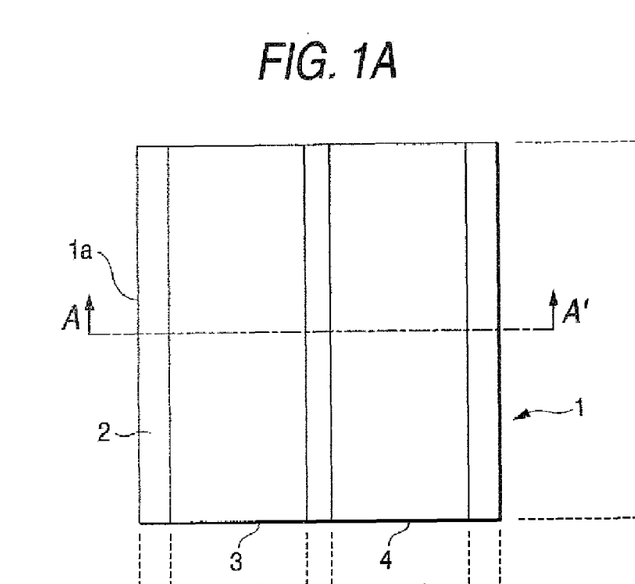
FIG. 1A is a front view of the embodiment.
Figure 1B:
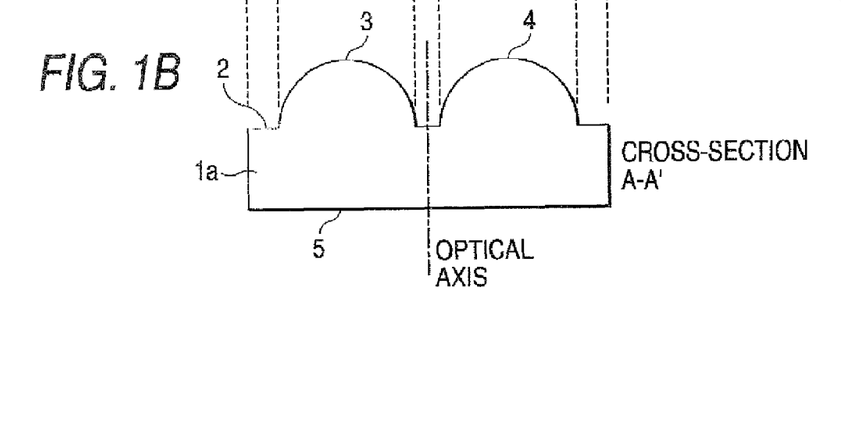
FIG. 1B is a cross-sectional view taken on line A-A' shown in FIG. 1A.
Figure 1C:
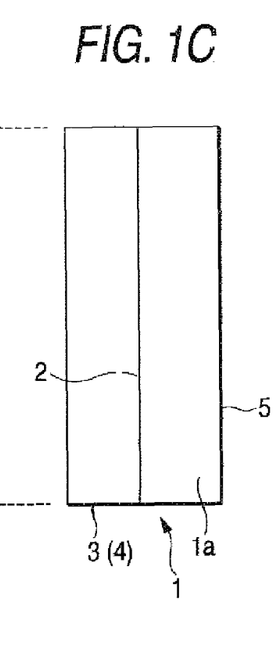
FIG. 1C is a side view thereof.

FIGS. 1A to 1C illustrate an embodiment of a longitudinal interference fringe pattern projection lens according to a first embodiment of the invention. FIG. 1A is a front view of the embodiment. FIG. 1B is a cross-sectional view taken on line A-A' shown in FIG. 1A. FIG. 1C is a side view thereof. In the following description of the present embodiment, an example of projecting a longitudinal interference fringe pattern by passing laser light (wavelength is 800 nm) through a lens of a special structure is described below.

As illustrated in FIG. 1A, the longitudinal interference fringe pattern projection lens includes a lens body 1a, a lens first surface 2, which constitutes one surface of the lens body 1a and has two convex portions 3 and 4 of the same shape extending in constant direction in parallel to each other, and also includes a lens second surface 5, which constitutes the other surface of the lens body 1a. When laser light is incident from the lens first surface 2, light having passed through the convex portion 3 interferes with light having passed through the convex portion 4, so that light output from the lens second surface 5 can be formed into a longitudinal interfere fringe pattern on an object. In the present embodiment, as illustrated in FIGS. 1A and 1C, each of the two convex portions 3 and 4 formed on the lens first surface 2 has a shape in which the two convex portions 3 and 4 linearly extends in parallel with each other. Additionally, the lens second surface 5 is formed into a flat surface.

Figure 2:
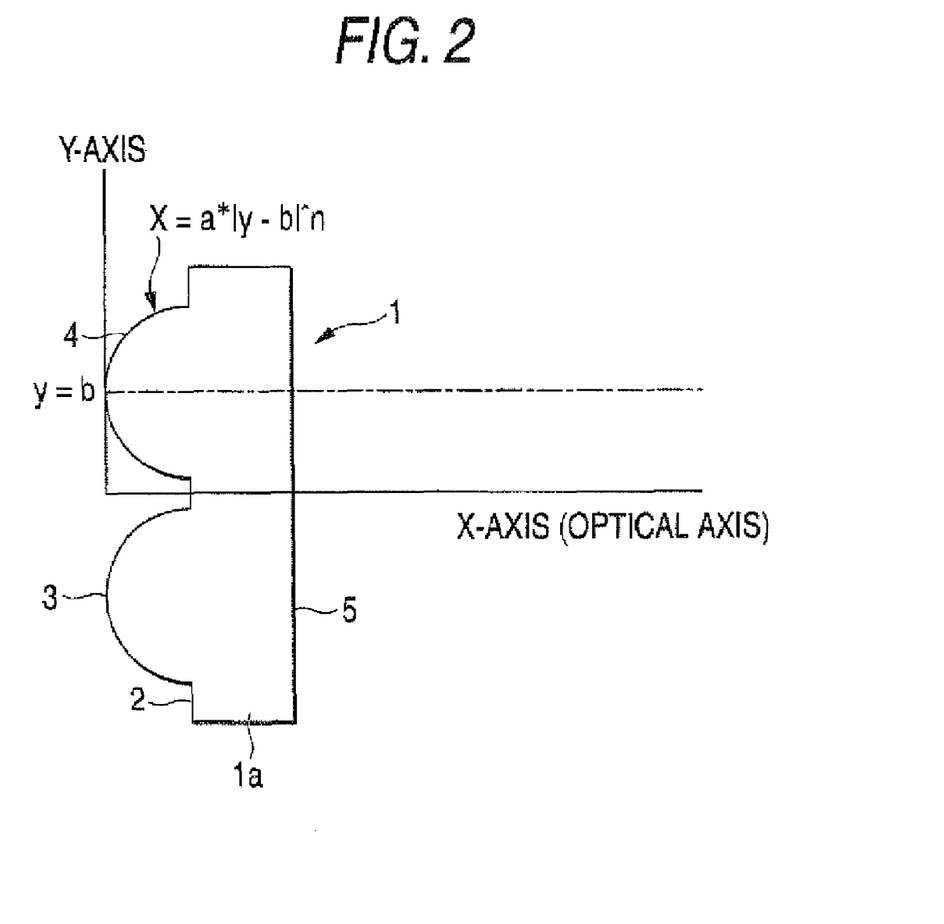
FIG. 2 is a view illustrating the relationship between a cross-section of the longitudinal interference fringe pattern projection lens and an optical axis.

FIG. 2 is a view illustrating the relationship between a cross-section of the longitudinal interference fringe pattern projection lens and an optical axis. That is, the lens 1 performs the wide-angle projection of light having passed through one of half-planes, into which a single plane (i.e., an (x-y)-plane) is divided by the optical axis, toward areas at both sides of the optical axis. Also, the lens 1 performs the wide-angle projection of light having passed through the other half-plane toward the areas at both sides of the optical axis. The lens 1 has the lens first surface 2 that have the two convex portions 3 and 4 of the same shape. A cross-section of the lens 1 is shaped like twin semicircles. In the present embodiment, as illustrated in FIG. 2, an x-axis is positioned between the two convex portions 3 and 4. The top part of the convex portion 4 is positioned at an ordinate y=b in the direction of a y-axis perpendicular to the x-axis. The shapes of the cross-sections of the convex portions 3 and 4 are represented by the following formula (1).

$$x = a * ||y| - b|^n \tag{1}$$

wherein a, b, and n represent real numbers, a is not equal 0, b is more than 0, and n is more than 0 and less than 4, || represents absolute value, and ^ represents exponentiation. More specifically, in the equation 1, for example, a=2, b=0.25, and n=2.1. The lens 1 is 1 mm in width in the y-direction, 1 mm in width in a z-direction, and 2 mm in thickness in the x-direction. A plastic lens is used as the lens 1. The refraction index of the lens 1 is 1.48.

Figure 3A:
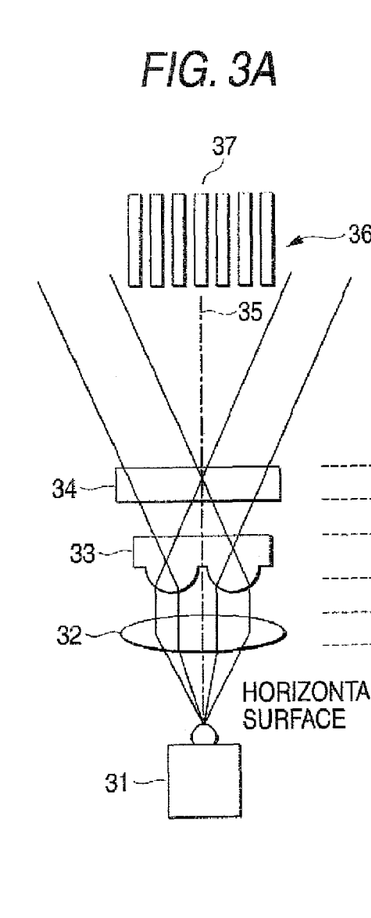
FIGS. 3A and 3B illustrate an example of an optical lens system using the lens shown in FIGS. 1A to 1C.

FIGS. 3A and 3B illustrate an example of an optical lens system using the lens shown in FIG. 1. As illustrated in these figures, this optical lens system includes a collimator lens 32 serving as the anterior lens adapted to change light beams radiated from a semiconductor laser (LD) light source 31 into parallel light rays, a longitudinal interference fringe pattern projection lens 33 shown in FIG. 1, and a concave lens 34 serving as the posterior lens adapted to perform the wide-angle projection of light output from the longitudinal interference fringe pattern projection lens 33. That is, in this example, light beams radiated from the laser light source 31 are first changed by the collimator lens 32 into parallel light beams. Next, the parallel light beams are incident on the lens (i.e., the twin-semicylindrical lens) having the twin-semicylindrical shape, that is, the longitudinal interference fringe pattern projection lens 33. The wide-angle projection of light passing through one of the convex portions of the twin-semicylindrical lens divided by the optical axis 35 is performed, as shown in FIG. 3A. Light beams coming from the two areas, into which the (X-y)-plane is divided by the optical axis 35, are superposed on the object 36, so that a longitudinal interference fringe pattern 37 is formed.

Figure 3B:
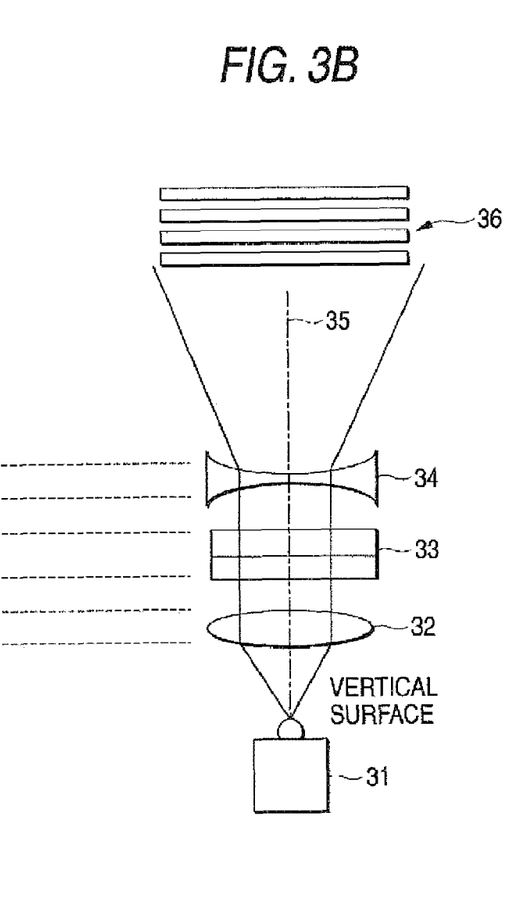

FIG. 3B is a cross-sectional view taken in a plane which is perpendicular to a plane shown in FIG. 3A and which the optical axis passes through. As illustrated in FIG. 3B, light beams output from the laser light source 31 are changed by the collimator lens 32 into parallel light beams. Then, the light beams rectilinearly pass through the next longitudinal interference fringe pattern projection lens 33. Subsequently, the posterior concave lens 34 performs the wide-angle projection of the light beams. Thus, in the plane shown in FIG. 3B, laser light beams do not interfere with each other. Instead, the laser light beams are simply projected.

Figure 4:
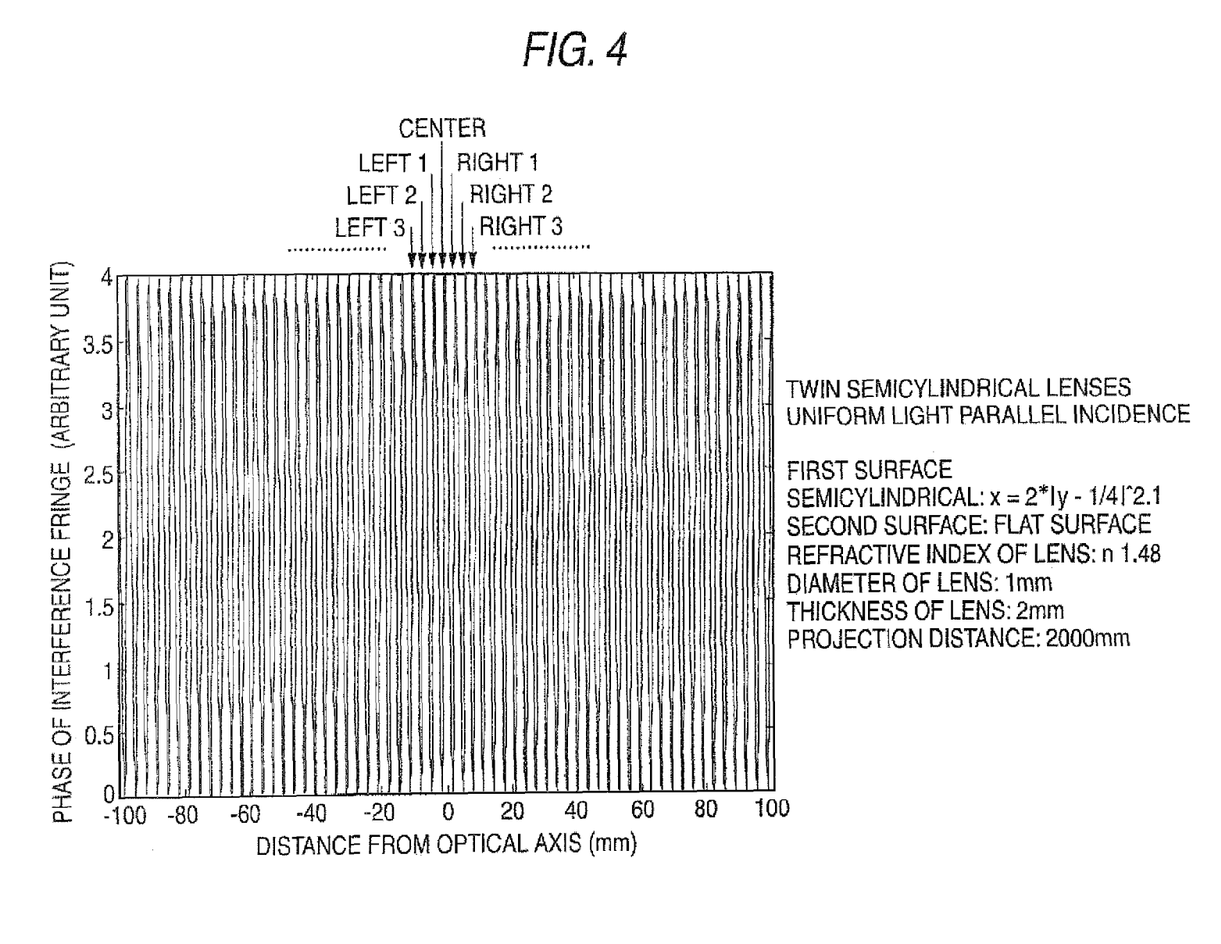
FIG. 4 is an explanatory view illustrating the pitch of the fringes of a longitudinal interference fringe pattern formed on a projection plane.

A longitudinal interference fringe pattern formed on a projection surface on the object 36 by such an optical lens system is observed. FIG. 4 shows the pitch of the fringes of the longitudinal interference fringe pattern in a case where the projection surface is placed at a distance of 1 m from the lens. Thus, the pitch of the fringes of the longitudinal interference fringe pattern is about 3 mm. As described above, a longitudinal interference fringe pattern can be formed, using the lens shown in FIG. 1. Accordingly, the wide-angle projection of the longitudinal interference infringe pattern can be performed, using the semiconductor laser and the relatively simple optical lens system.

Second Embodiment

Figures 5A, 5B, 5C:
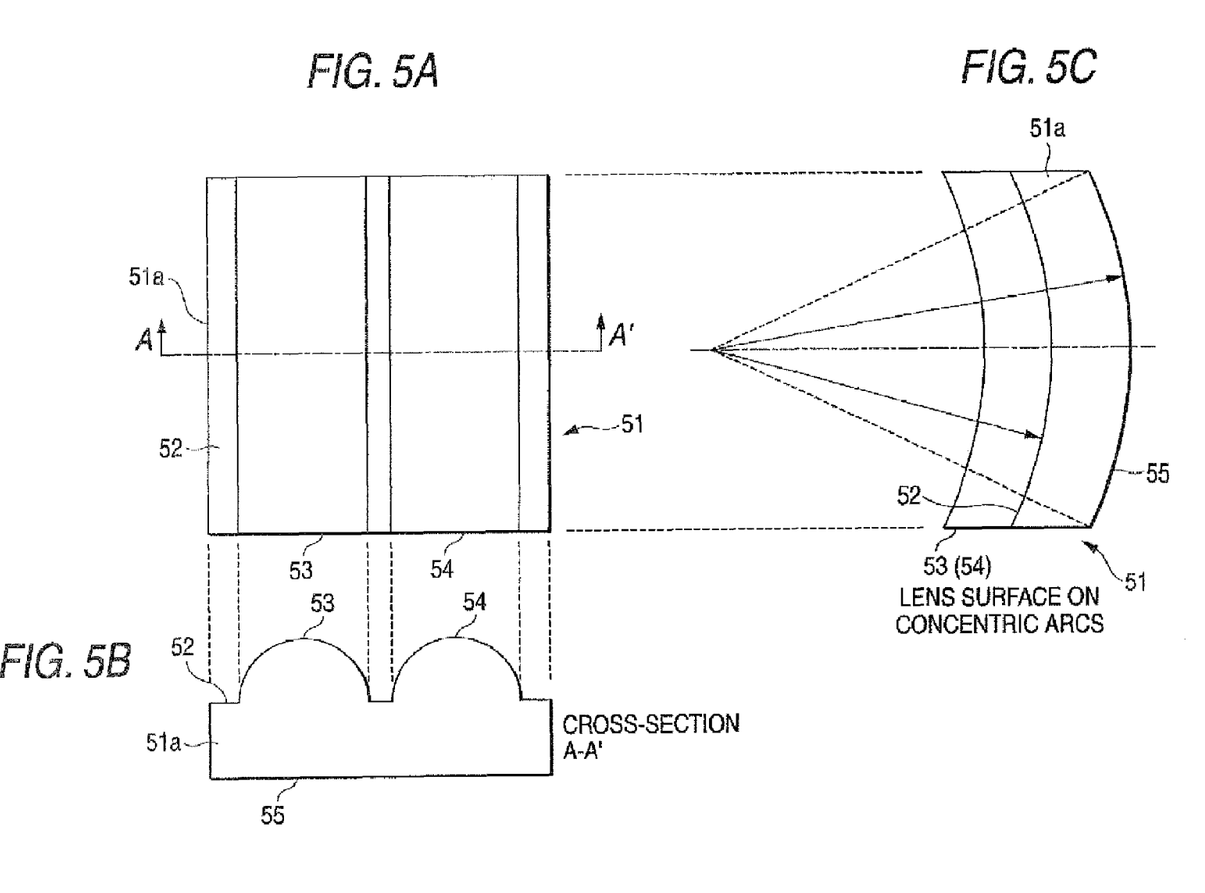
FIG. 5A is a front view of this embodiment.
FIG. 5B is a cross-sectional view taken on line A-A' shown in FIG. 5A.
FIG. 5C is a side view thereof.

FIGS. 5A to 5C illustrate a second embodiment of the longitudinal interference fringe pattern projection lens according to the invention. FIG. 5A is a front view of this embodiment. FIG. 5B is a cross-sectional view taken on line A-A' shown in FIG. 5A. FIG. 5C is a side view thereof. In the following description of the second embodiment, an example of projecting a longitudinal interference fringe pattern by passing laser light (the wavelength thereof is 800 nm) output from a semiconductor laser light source through a lens of a special structure.

As illustrated in FIG. 5A, a longitudinal interference infringe pattern projection lens 51 includes a lens first surface 52, which has two convex portions 53 and 54 of the same shape extending in a direction in parallel to each other, and also includes a lens second surface 55. When laser light is incident from the lens first surface 52, light having passed through the convex portion 53 interferes with light having passed through the convex portion 54, so that light output from the lens second surface 55 can be formed into a longitudinal interfere fringe pattern on an object. In the present embodiment, as illustrated in FIGS. 5A and 5C, each of the two convex portions 53 and 54 formed on the lens first surface 52 has a curved shape. Additionally, the lens second surface 55 is formed into a curved surface similar to the shape of the lens first surface.

In the present embodiment, more specifically, the lens first surface 52 and the lens second surface 55 are formed so that the cross-sections of the lens first surface 52 and the lens second surface 55 are on concentric arcs formed around a certain point, respectively. The certain point is, for example, a luminous point of the laser light source. Thus, the lens 51 is shaped, so that light radiated from the laser light source can rectilinearly travel without being refracted through the lens 51.

Figure 6A:
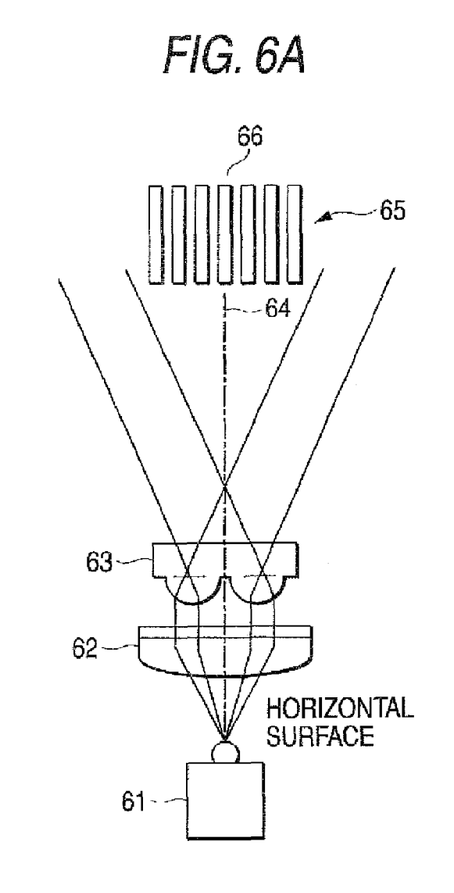
FIGS. 6A and 6B illustrate an example of an optical lens system using the lens shown in FIGS. 5A to 5C.
Figure 6B:
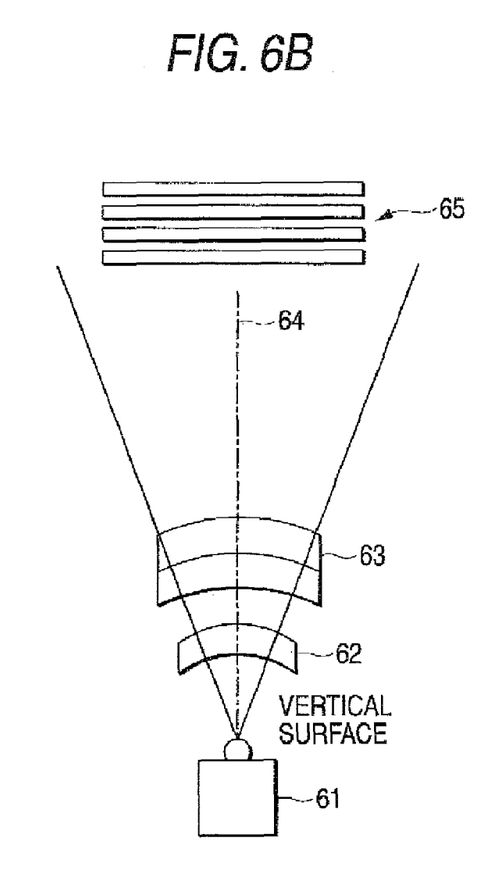

FIGS. 6A and 6B illustrate an example of an optical lens system using the lens shown in FIG. 5. As illustrated in these figures, this optical lens system includes an anterior lens 32 adapted to change light beams radiated from a semiconductor laser (LD) light source 61 into parallel light rays on a certain plane, and a longitudinal interference fringe pattern projection lens 63 having a lens first surface, which has two convex portions or two concave portions of the same shape extending in a direction in parallel with each other, and a lens second surface, so that the cross-sections of the lens first surface and the lens second surface are on concentric arcs formed around the laser light source, and that light having passed through one of the convex portion or the concave portion from the anterior lens interferes with light having passed through the other convex portion or the other concave portion from the anterior lens to thereby form a longitudinal interference fringe pattern.

FIG. 6A illustrates a cross-section of the optical lens system, which is on a horizontal plane passing through the optical axis. Light beams output from the laser light source 61 are changed by the anterior lens 62 into parallel light beams. Subsequently, light beams passed by the twin semicylindrical lens through an area at the left side of the optical axis 64 and an area at the right side of the optical axis 64, respectively, as viewed in FIG. 6A, are superposed on the object 36 to thereby from a longitudinal interference fringe pattern. FIG. 6B illustrates a cross-section of the optical lens system, which is on a vertical plane passing through the optical axis. Each of the lenses is configured so that in this plane, light radiated from the laser light source 61 rectilinearly travels without being deflected by each of the lens surfaces. Therefore, light radiated from the laser light source 61 are projected while maintaining a spread angle. Apparently, light beams are not superposed on the projection surface, so that no interference infringe pattern is formed. Accordingly, with this lens configuration, the wide-angle projection of a longitudinal interference infringe pattern toward the object 65 can be performed. According to the present embodiment, the number of lenses of the optical system can be reduced, as compared with the first embodiment. Consequently, a longitudinal interference infringe pattern can be formed by a simpler optical lens system.

Third Embodiment

Figure 7:
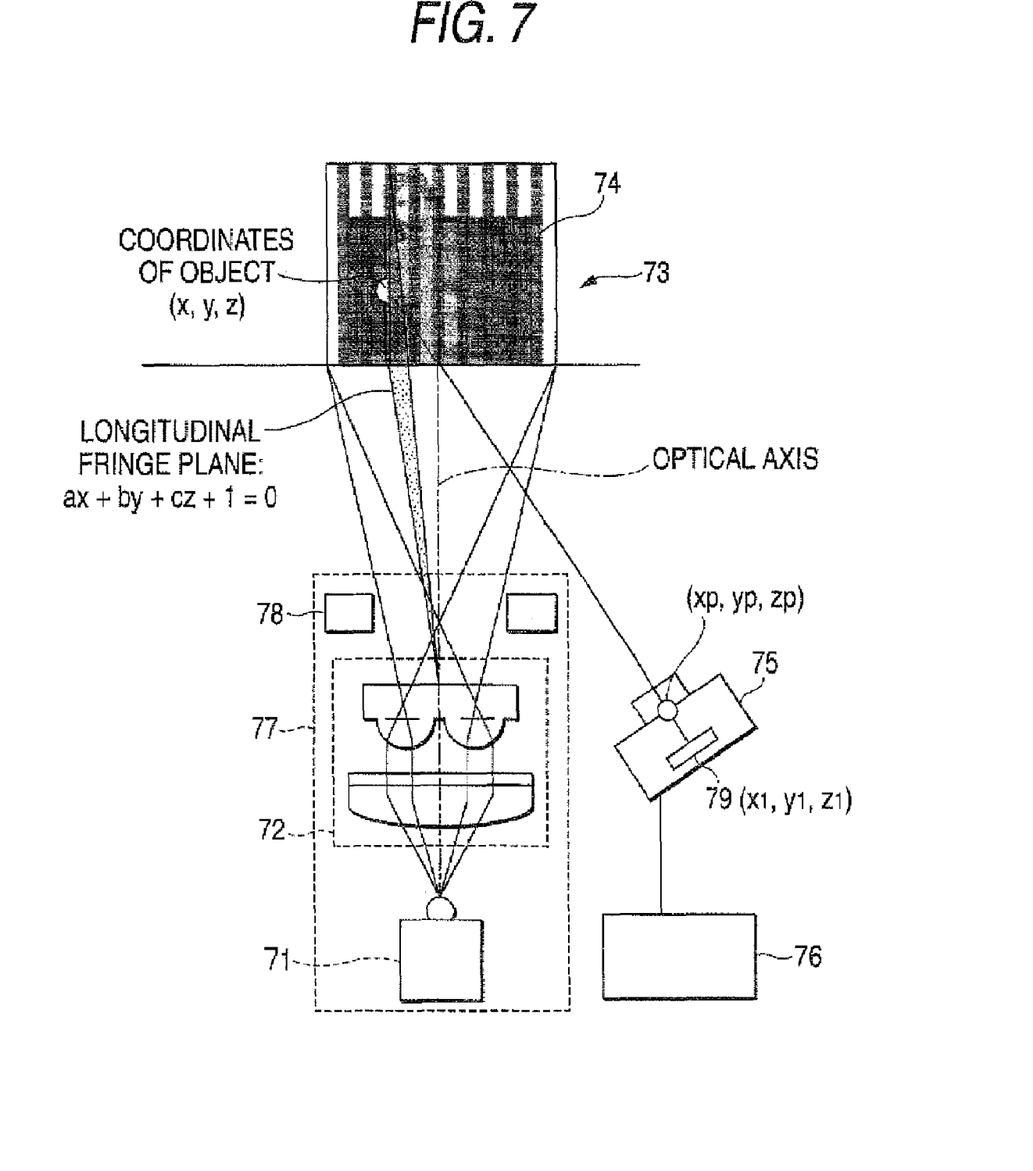
FIG. 7 is a view illustrating an embodiment of a three dimensional image acquisition apparatus using the longitudinal interference fringe pattern projection lens according to the invention.

FIG. 7 is a view illustrating an embodiment of a three dimensional image acquisition apparatus using the longitudinal interference fringe pattern projection lens according to the invention. As illustrated in FIG. 7, the present embodiment includes a laser light source 71, an optical lens system 72 configured to project a longitudinal interference infringe pattern by causing light beams radiated from the laser light source 71 to interfere with each other, a camera 75 adapted to image a longitudinal interference infringe pattern 74 projected onto the object 73, and a computing unit 76 that acquires a three-dimensional image of the object 73 according to the imaging information output from the camera 75. The optical systems used in the first and second embodiments are employed as the optical lens system 72. Also, a light emitting module 77 can be obtained by integrating the laser light source 71 with the optical lens system 72. The light emitting module 77 is provided separately from camera 75, as illustrated in this figure. However, the light emitting module 77 can be mounted in the camera 75 as a photographing flash device. Further, the computing unit 76 is connected to the exterior of the camera 77, as illustrated in this figure. However, the computing unit 76 can be incorporated in the camera 75.

Also, a rectangular window 78 adapted to limit a projection range, in which a longitudinal interference infringe pattern is projected so that the number of infringes of the longitudinal interference infringe pattern projected from the longitudinal interference infringe pattern projection lens of the light emitting module 77 is a predetermined value, can be provided in or outside the light emitting module 77. That is, a rectangular window 78 adapted to restrict the projection range at the projection of the longitudinal interference infringe pattern is provided. Thus, as illustrated in FIG. 7, the number of infringes of the projection interference infringe pattern is limited.

In the present embodiment, the longitudinal interference infringe pattern 74 was constituted by alternately arranging light patterns and dark patterns from the left side, as viewed in FIG. 7. The projection range restricting window 78 was set so that the longitudinal interference infringe pattern 74 included 9 light patterns, and that the light pattern was placed at the right end of the longitudinal interference infringe pattern 74, as viewed in FIG. 7. The object 73, onto which the longitudinal interference infringe pattern 74 was projected, was imaged by the camera 75 provided at the side of the light emitting module 77. The longitudinal interference infringe pattern 74 was imaged by the camera 75 as an image distorted according to the irregularity of the shape of the object 73.

A method of acquiring a range image is performed as follows. First, first to ninth light infringes of the longitudinal interference infringe pattern 74 are detected from the imaged longitudinal interference infringe pattern 74. When it is known what number of the detected light infringe, a plane corresponding to the detected light infringe is expressed by the following equation 2.

$$ax+by+cz+1=0 \quad \text{(equation 2)}$$

where a, b, and c are known coefficients.

Next, a high-luminance point at an imaging element (CCD) 79 of the camera 75, which corresponds to a single longitudinal interference infringe pattern projected onto the object, is detected from the image. Then, the position coordinates $(x_1, y_1, z_1)$ of the high-luminance point is calculated from CCD pixel positions and angles in the camera 75. Assuming that the position of the principal point of the camera lens is $(x_p, y_p, z_p)$, a straight line determined by the pixel positions of the high-luminance points is represented by the following expression.

$$\begin{bmatrix} x \\ y \\ z \end{bmatrix} = \begin{bmatrix} x_1 \\ y_1 \\ z_1 \end{bmatrix} + m \begin{bmatrix} x_p - x_1 \\ y_p - y_1 \\ z_p - z_1 \end{bmatrix} \quad \text{(equation 3)}$$

where only "m" is an unknown number. The unknown number "m" is obtained by substituting the three straight-line equations represented by the equation 3 for the plane equation represented by the equation 2. Consequently, the three dimensional coordinates (x, y, z) of the object are obtained. Thus, the high-luminance points corresponding to the light fringe pattern of the longitudinal interference fringe pattern are sequentially detected. The three dimensional coordinates of the object determined by the one fringe line is obtained. Similar processing is performed on each of longitudinal interference infringe pattern to thereby obtain the three dimensional coordinates of the entire object.

According to the present embodiment, a three-dimensional image of the object can be acquired simply by projecting a longitudinal interference infringe pattern onto an object through a projection means, which is simple and can be miniaturized, and imaging the longitudinal interference infringe pattern projected onto the object through an ordinary digital camera. In a case where the means for projecting the longitudinal interference infringe pattern is mounted as a flash device of a camera, the apparatus can be made to be more compact and portable. Consequently, the apparatus can easily acquire a three-dimensional image of an object.

Figure 8:
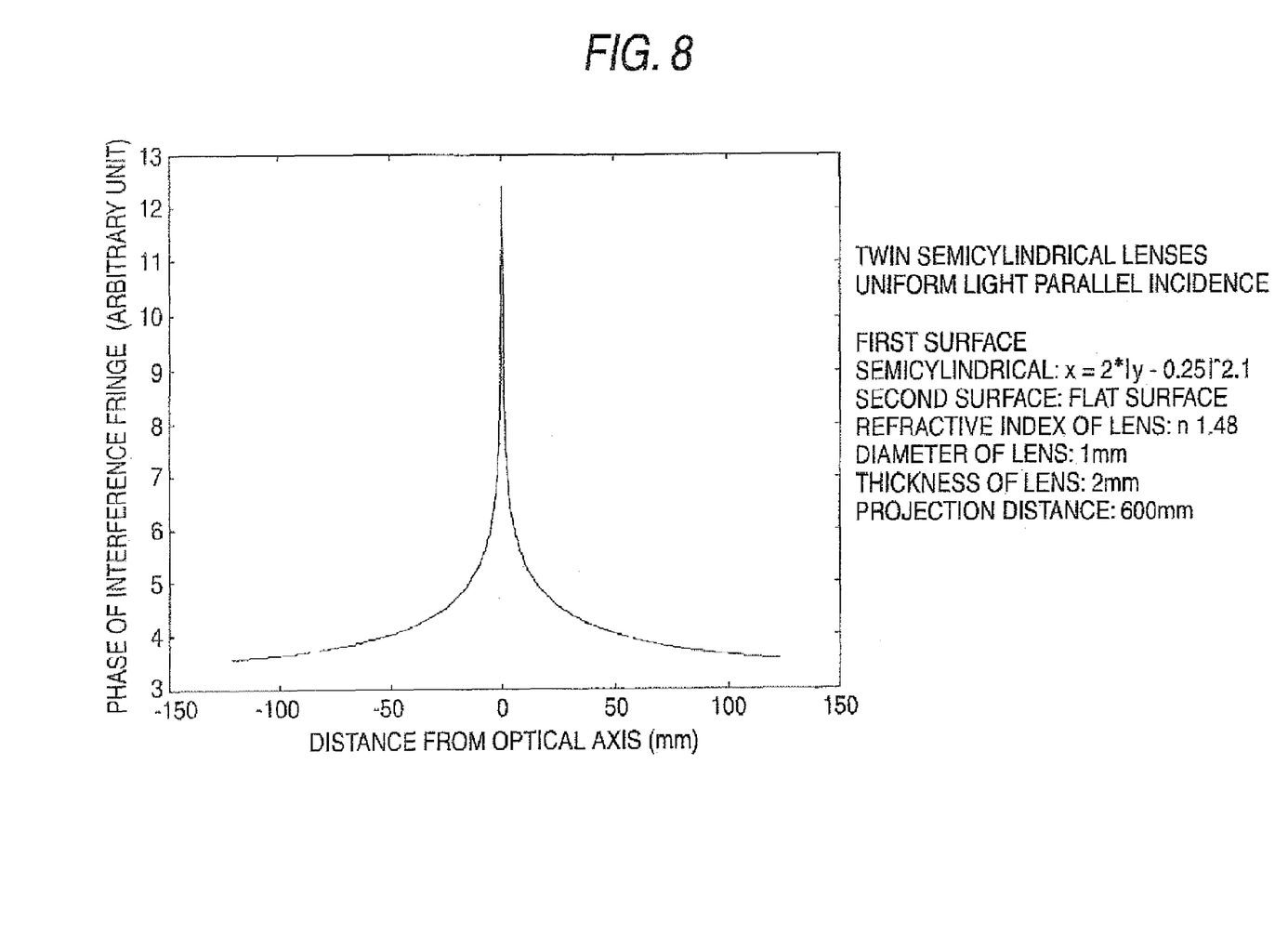
FIG. 8 is a graph illustrating an example of a result of simulation of the distribution of an amount of light of a projected longitudinal interference fringe pattern.

FIG. 8 is a graph illustrating an example of a result of simulation of the distribution of an amount of light in a projected longitudinal interference infringe pattern. In this example, a longitudinal interference infringe pattern is projected onto an object using the method of projecting a longitudinal interference infringe pattern, which has been described in the description of the first embodiment. The object is placed at a distance of 600 mm form the lens. The lens used in the first embodiment is also used in the third embodiment. The graph shown in FIG. 8 illustrates the light projection intensity of light having passed through only one of parts respectively provided at both sides of the optical axis. As can be understood from FIG. 8, the intensity of light has a peak at the central portion of the lens, as compared with peripheral portions of the lens. The distribution of the intensity of light in the interference fringe actually projected is obtained by multiplying each of the values of the intensity of light by a phase cycle of the interference infringes, which is illustrated in FIG. 4. The intensity of light at the interference infringes, to which numbers such as the right 1, the right 2, and the right 3 are assigned, is attenuated, as illustrated in FIG. 8. Accordingly, the longitudinal interference infringe pattern projected onto the object is imaged. In the image, the infringe having the highest intensity is employed as the reference. Numbers, such as a right Nth (N is a natural number) or a left Nth, can be assigned to the longitudinal infringes. A plane equation like the equation 2 can be determined according to this number. A point of intersection of the plane determined by the plane equation and a straight line determined by the pixel positions of the highest luminance points represented by the equation 3 is obtained, so that a three-dimensional image can be obtained.

Thus, according to the invention, a three-dimensional image can be acquired according to number information by sequentially assigning numbers to longitudinal interference infringe patterns projected onto an object. A plane corresponding to a central high-light-intensity longitudinal fringe can be utilized as a reference plane. Thus, numbers can be assigned to the fringes, and a three-dimensional image can simply be obtained without a projection range restricting window.

Fourth Embodiment

Figure 9A:
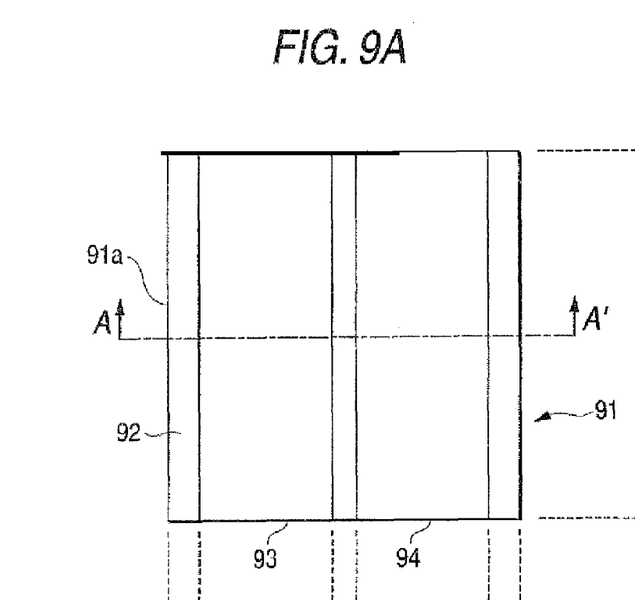
FIG. 9A is a front view of this embodiment.
Figure 9B:
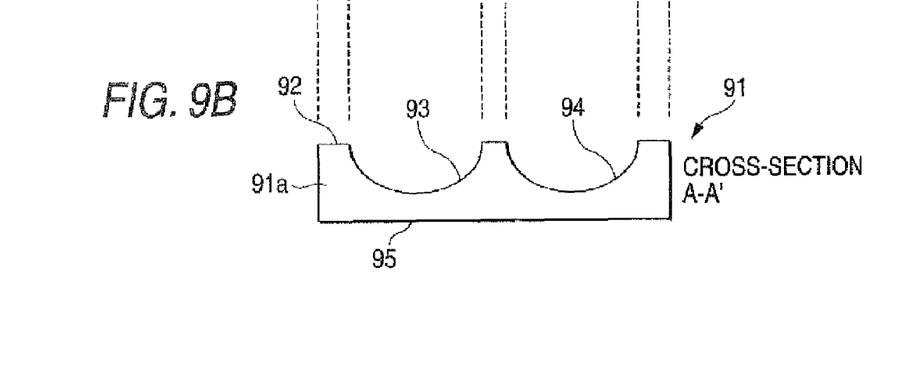
FIG. 9B is a cross-sectional view taken on line A-A' shown in FIG. 9A.
Figure 9C:
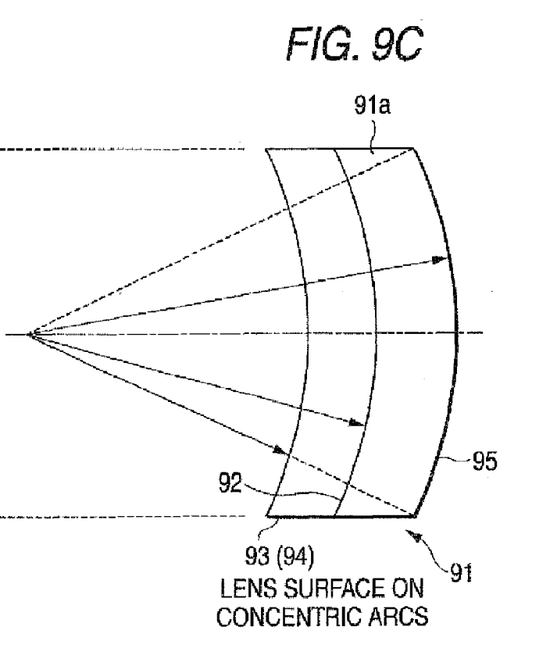
FIG. 9C is a side view thereof.

FIGS. 9A to 9C illustrate another embodiment of the longitudinal interference fringe pattern projection lens according to the invention. FIG. 9A is a front view of this embodiment. FIG. 9B is a cross-sectional view taken on line A-A' shown in FIG. 9A. FIG. 9C is a side view thereof. Although the lenses according to the first and second embodiments are adapted so that the lens first surface has two convex portions, the lens first surface of the fourth embodiment has two concave portions. The rest of the fourth embodiment is similar to the corresponding parts of the first and second embodiments. Consequently, similarly to the first and second embodiments, a longitudinal interference infringe pattern can be projected. Hereinafter, the fourth embodiment is described in detail below.

According to the present embodiment, as illustrated in FIG. 9A, a longitudinal interference infringe pattern projection lens 91 includes a lens first surface 92, which has two concave portions 93 and 94 of the same shape extending in a direction in parallel to each other, and also includes a lens second surface 95. When laser light is incident from the lens first surface 92, light having passed through the concave portion 93 interferes with light having passed through the concave portion 94, so that light output from the lens second surface 95 can be formed into a longitudinal interfere fringe pattern on an object. In the present embodiment, as illustrated in FIGS. 9A and 9C, the shape of a cross-section of each of the two concave portions 93 and 94 formed on the lens first surface 92 is represented by the equation 1. The two concave portion of the lens first surface can be shaped to linearly extend in parallel with each other, and the lens second surface can be shaped like a plane. However, according to the present embodiment, the cross-sections of the two concave portions 93 and 94 of the lens first surface are shaped like curved shapes. Additionally, the lens second surface 95 is formed into a curved surface similar to the shape of the lens first surface.

In the present embodiment, more specifically, the lens first surface 92 and the lens second surface 95 are formed so that the cross-sections of the lens first surface 92 and the lens second surface 95 are on concentric arcs formed around a certain point, respectively. The certain point is, for example, a luminous point of the laser light source. Thus, the lens 91 is shaped, so that light radiated from the laser light source can rectilinearly travel without being refracted through the lens 91. According to the present embodiment, a longitudinal interference infringe pattern can be formed by a simple optical lens system, similarly to the first and second embodiments.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A longitudinal interference fringe pattern projection lens comprising:
    a lens body;
    a lens first surface that constitutes one surface of the lens body, and that has two convex portions or two concave portions, which extend in parallel to each other in a constant direction and have a same shape; and
    a lens second surface that constitutes the other surface of the lens body,
    wherein laser light passing through one convex or concave portion interferes with laser light passing through the other convex or concave portion to form a longitudinal interference fringe pattern.

2. The longitudinal interference fringe pattern projection lens as claimed in claim 1, wherein:
    the two convex portions or the two concave portions linearly extend in parallel to each other on the lens first surface; and
    the lens second surface has a planar shape.

3. The longitudinal interference fringe pattern projection lens as claimed in claim 1, wherein the lens first and second surfaces are on arcs of concentric circles formed around a point.

4. The longitudinal interference fringe pattern projection lens as claimed in claim 1, wherein:
    a shape of a cross-section of each of the two convex portions or the two concave portions in a plane along with an optical axis of the lens body is represented by a curve expressed by the following formula (1):

$$x = a * ||y| - b|^n \qquad (1)$$

wherein a, b, and n represent real numbers, a is not equal 0, b is more than 0, n is more than 0 and less than 4, || represents absolute value, and ^ represents exponentiation.

5. The longitudinal interference fringe pattern projection lens as claimed in claim 1, wherein the longitudinal interference fringe pattern is formed of interference fringes that run substantially in a lengthwise direction and are substantially parallel to each other.

6. An optical system comprising:
    an anterior lens that changes light beams radiated from a light source into parallel light rays;
    a longitudinal interference fringe pattern projection lens including:
        a lens body;
        a lens first surface that constitutes one surface of the lens body, and that has two convex portions or two concave portions, which extend in parallel to each other in a constant direction and have a same shape; and
        a lens second surface that constitutes the other surface of the lens body,
        wherein the longitudinal interference fringe pattern projection lens causes light output from the anterior lens, which passes through one convex or concave portion, to interfere with light passing through the other convex or concave portion to project a longitudinal interface fringe pattern; and
    a posterior lens that performs wide-angle projection of light output from the longitudinal interference fringe pattern projection lens.

7. The optical system as claimed in claim 6, further comprising a window that limits a projection range, such that the number of fringes of the longitudinal interference fringe pattern projected by the longitudinal interference fringe pattern projection lens has a desired value.

8. The optical system as claimed in claim 6, wherein:
a shape of a cross-section of each of the two convex portions or the two concave portions in a plane along with an optical axis of the lens body is represented by a curve expressed by the following formula (1):

$$x = a * ||y| - b|\hat{\ }n \tag{1}$$

wherein a, b, and n represent real numbers, a is not equal 0, b is more than 0, n is more than 0 and less than 4, || represents absolute value, and ^ represents exponentiation.

9. A three-dimensional image acquisition apparatus comprising:
a laser light source;
the optical system according to claim 6, which causes interference of light beams output from the laser light source and which projects a longitudinal interference fringe pattern onto an object;
a camera that takes an image of the longitudinal interference fringe pattern projected from the optical lens system; and
a computing unit that obtains a three-dimensional image of the object based on photographing information output from the camera.

10. The three-dimensional image acquisition apparatus as claimed in claim 9, further comprising a light emitting module that is constituted by integrating the laser light source with the optical system, and that is mounted as a photographing flash device for the camera.

11. The three-dimensional image acquisition apparatus as claimed in claim 9, wherein the computing unit is incorporated in the camera.

12. The three-dimensional image acquisition apparatus as claimed in claim 9, wherein three-dimensional image acquisition apparatus sequentially assigns numbers to the longitudinal interference fringe pattern projected onto the object, and obtains a three-dimensional image based on the assigned number.

13. The optical system as claimed in claim 6, wherein the longitudinal interference fringe pattern is formed of interference fringes that run substantially in a lengthwise direction and are substantially parallel to each other.

14. An optical system comprising:
an anterior lens that changes light beams radiated from a light rays; and
a longitudinal interference fringe pattern projection lens comprising:
a lens body;
a lens first surface that constitutes one surface of the lens body, and that has two convex portions or two concave portions, which have a same shape and extend in a constant direction; and
a lens second surface that constitutes the other surface of the lens body, the lens first surface and the lens second surface being on arcs of concentric circles formed around a point,
wherein the longitudinal interference fringe pattern projection lens causes light output from the anterior lens, which passes through one convex or concave portion, to interfere with light passing through the other convex or concave portion to project a longitudinal interference fringe pattern.

15. The optical system as claimed in claim 14, further comprising a window that limits a projection range, such that the number of fringes of the longitudinal interference fringe pattern projected by the longitudinal interference fringe pattern projection lens has a desired value.

16. The optical system as claimed in claim 14, wherein:
a shape of a cross-section of each of the two convex portions or the two concave portions in a plane along with an optical axis of the lens body is represented by a curve expressed by the following formula (1):

$$x = a * ||y| - b|\hat{\ }n \tag{1}$$

wherein a, b, and n represent real numbers, a is not equal 0, b is more than 0, n is more than 0 and less than 4, || represents absolute value, and ^ represents exponentiation.

17. The optical system as claimed in claim 14, wherein the longitudinal interference fringe pattern is formed of interference fringes that run substantially in a lengthwise direction and are substantially parallel to each other.

\* \* \* \* \*